United States Patent
Huang

(10) Patent No.: US 7,971,795 B2
(45) Date of Patent: Jul. 5, 2011

(54) MANUFACTURING METHOD OF PRODUCTS ATTACHED WITH RFID LABEL IN A MOLD

(75) Inventor: Sheng-Chang Huang, Kaohsiung County (TW)

(73) Assignees: Sheng-Chang Huang, Kaohsiung County (TW); Supreme Technic Package Co., Ltd., Tainan (TW)

( * ) Notice: Subject to any disclaimer, the term of this patent is extended or adjusted under 35 U.S.C. 154(b) by 431 days.

(21) Appl. No.: 12/268,332

(22) Filed: Nov. 10, 2008

(65) Prior Publication Data

US 2009/0065974 A1    Mar. 12, 2009

Related U.S. Application Data

(62) Division of application No. 11/680,453, filed on Feb. 28, 2007, now abandoned.

(51) Int. Cl.
*G06K 19/06* (2006.01)
(52) U.S. Cl. .......................... 235/492; 235/380; 235/486
(58) Field of Classification Search .................. 235/492, 235/487, 380; 361/737
See application file for complete search history.

(56) References Cited

U.S. PATENT DOCUMENTS

| | | | | |
|---|---|---|---|---|
| 6,025,054 A * | 2/2000 | Tiffany, III | .................... | 428/189 |
| 6,330,162 B2 * | 12/2001 | Sakamoto et al. | ............ | 361/737 |
| 6,957,777 B1 * | 10/2005 | Huang | .......................... | 235/492 |
| 6,991,175 B1 * | 1/2006 | Huang | .......................... | 235/492 |
| 2003/0146284 A1 * | 8/2003 | Schmit et al. | ............ | 235/462.44 |

* cited by examiner

*Primary Examiner* — Ahshik Kim
(74) *Attorney, Agent, or Firm* — J.C. Patents

(57) ABSTRACT

A manufacturing method of products attached with a RFID label in a mold includes a first step of forming a thin substratum by injecting molding, pushing molding, vacuum molding, blowing molding or sword molding in a first mold, a second step of making a substratum label composed of the substratum and an RFID label adhered with the substratum, and a third step of placing the substratum label in a second mold, in which a plastic product is to be formed and also to be attached with the substratum label inside the product during molding process. Thus, protected by the substratum and the plastic product. The RFID cannot be broken or damaged to always maintain its capacity to be identified, with the plastic product enhanced in its value.

4 Claims, 8 Drawing Sheets

( A )

( B )

MANUFACTURING METHOD OF PRODUCTS ATTACHED WITH RFID LABEL IN A MOLD

CROSS-REFERENCE TO RELATED APPLICATIONS

This application is a division of application Ser. No. 11/680,453 filed on Feb. 28, 2007, now abandoned the content of which is hereby incorporated by reference in its entirety.

BACKGROUND OF THE INVENTION

1. Field of the Invention

This invention relates to a manufacturing method of products attached with an RFID (radio frequency identification device) in a mold, particularly to one having several steps for making a product attached with a substratum label consisting of a substratum and a radio frequency identification device during forming the plastic product in a mold. Then the RFID combined with the label is positioned between the substratum and the plastic product so that the RFID is protected from unnecessarily broken or damaged, with its identifying capacity possible to be always maintained intact.

2. Description of the Prior Art

Nowadays radio frequency identification has widely been used on various goods, in order to escalate the speed of circulation, identification, and filing. At present the chips used for radio frequency identification always have an adhesive film layer glued on the electronic circuit of the chip, and then the adhesive film layer is adhered on a product, and an adhesive layer is further attached on the adhesive film layer for protecting the radio frequency identification device under the film layer from being broken, damaged or worn off.

However, the conventional radio frequency identification system has a flow that it cannot be applied to a wide variety, in other words, it is extremely limited in its applicable scope, with every circuit board necessary to be adhered on with an adhesive layer, so it is not convenient for mass production, increasing manufacturing processes, lowering effectiveness and enhancing its cost.

There are Taiwan patent No. 93127285, China patent NO. 200410078355, and U.S. Pat. No. 6,957,777 B1 disclosed the same "Label to be attached on a plastic product formed in a mold and identifiable by a detective device" wherein a substratum is made of a soft circuit board for arranging thereon a RFID (radio frequency identification device) and an antenna.

SUMMARY OF THE INVENTION

This invention has been devised to offer a manufacturing method of products attached with an RFID label in a mold, for protecting the RFID label from broken or worn out so as to keep intact the identifying capacity of the RFID.

The invention has the following features.
1. The first step of the manufacturing method is to prepare a first mold for making a substratum, and the material of the substratum may be the same as or different from that of a plastic product made in this method.
2. The substratum can be a thin film, a very thin plate, a foam thin plate, or a compound plate depending on the necessity of the plastic product.
3. The second step is to combine an RFID label with the substratum, and the RFID label is composed of a radio frequency identification chip, an antenna and an adhesive surface, and adhered on the substratum with the adhesive surface. Or before the RFID is not formed with the glue surface, it is combined with the substratum by means of an adhesive film, high frequency process or supersonic process, making a substratum label containing the substratum and the RFID label and then to be adhered with the plastic product during injecting molding process of the plastic product.
4. The RFID label can be added with a printed layer, which further has a linking layer.
5. The third step of the method is to place the substratum label in a second mold that a plastic product is to be formed, so the RFID label can be wrapped automatically between the substratum and a plastic product during the molding process.

BRIEF DESCRIPTION OF DRAWINGS

This invention will be better understood by referring to the accompany drawings, wherein.

DETAILED DESCRIPTION OF THE PREFERRED EMBODIMENTS

Figure 1:
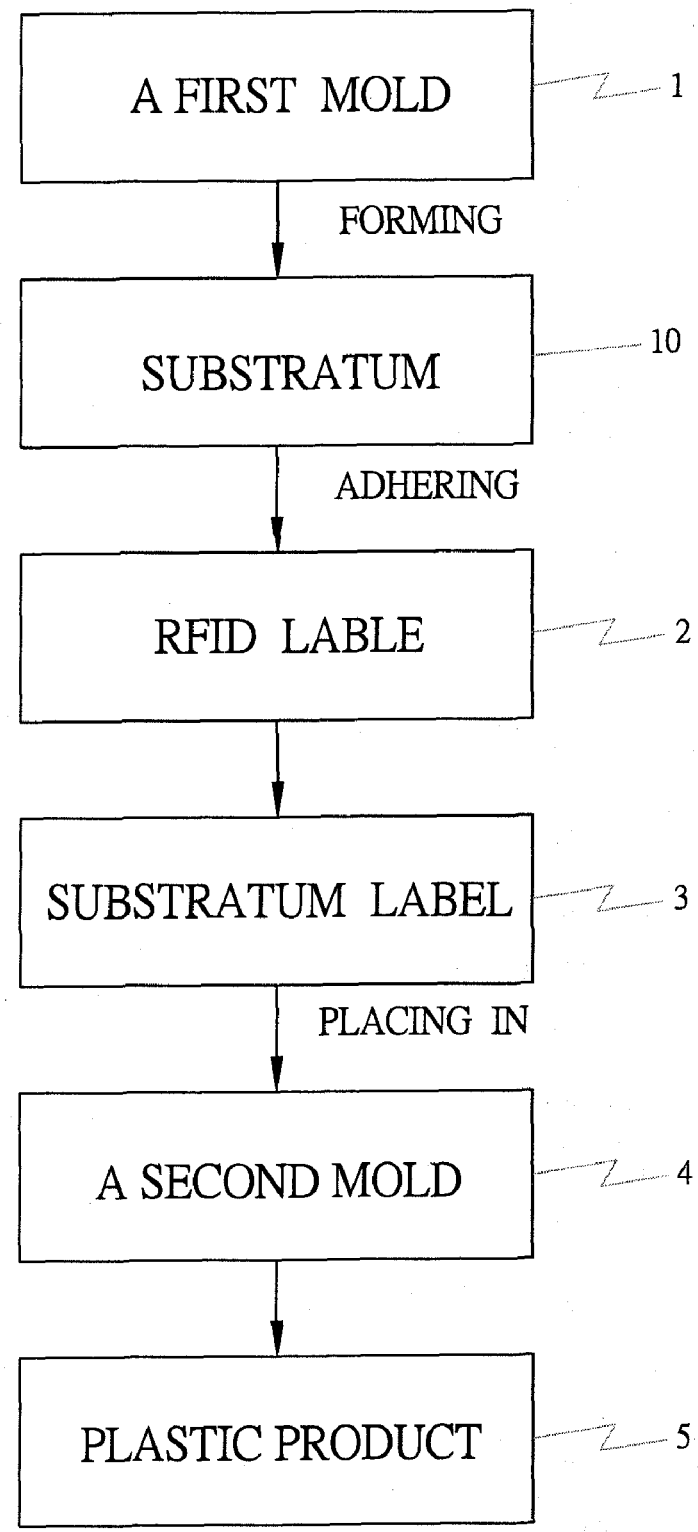
FIG. 1 is a flow chart of a manufacturing method of products attached with an RFID label in a mold in the present invention.

A first preferred embodiment of a manufacturing method of products formed in a mold and attached with a RFID label during molding process in the present invention, as shown in FIG. 1, includes a first step, a second step, and a third step.

The first step is to prepare a first mold 1 for forming a substratum 10 by means of injecting molding, pushing molding, vacuum molding, pressing molding or sword molding, and the substratum may be made of the same as or a different material from that of plastic products, as a thin film, a thin plate, a foamed thin sheet, or a compound thin plate having a thickness 0.1-1.0 mm according to the necessity of a product, but it may be thinner than 0.1 mm or thicker than 1.0 mm, if necessary.

Figure 6:
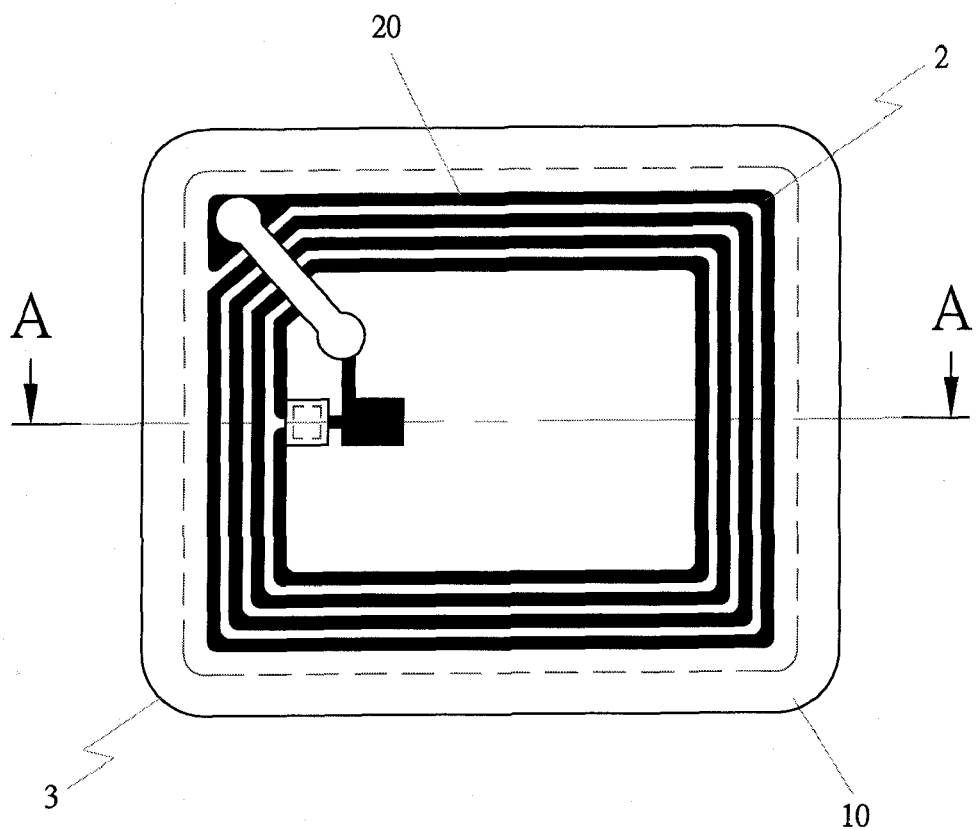
FIG. 6 is an upper view of a substratum used in the manufacturing method of products attached with an RFID label in a mold in the present invention.
Figure 7:
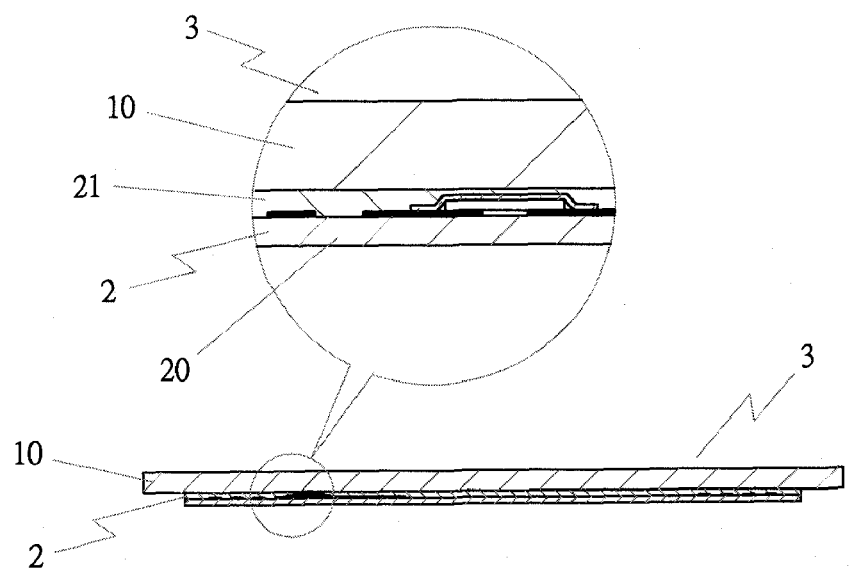
FIG. 7 is a cross-sectional view of the line A-A in FIG. 6.
Figure 8:
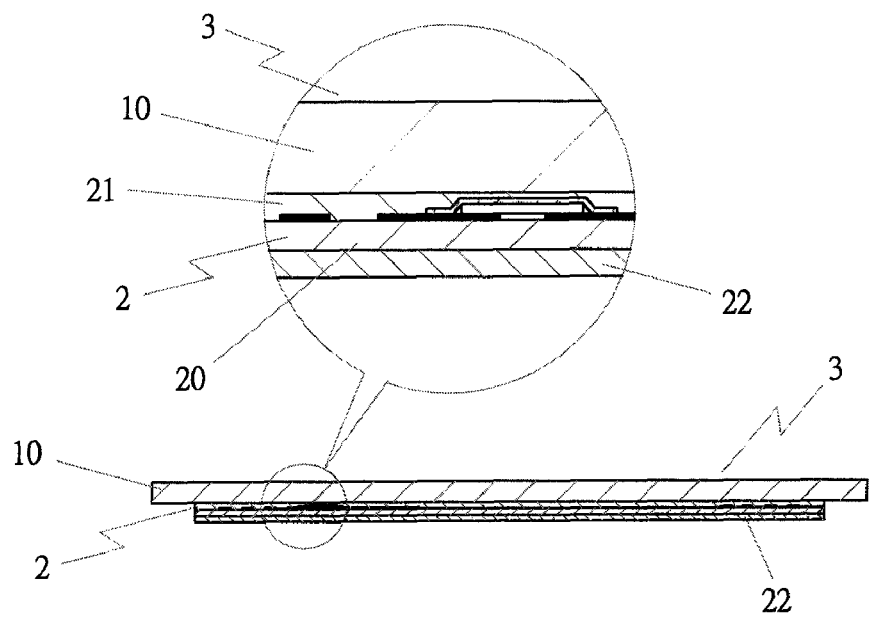
FIG. 8 is a cross-sectional view of a substratum label used in the second preferred embodiment of a manufacturing method in the present invention.
Figure 9:
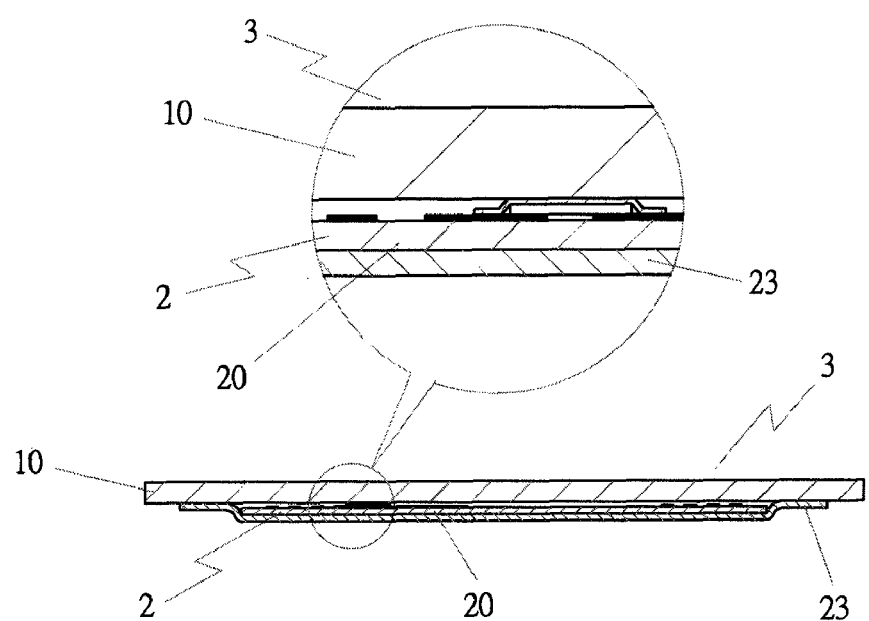
FIG. 9 is a cross-sectional view of a substratum label used in a third preferred embodiment of a manufacturing method in the present invention.
Figure 10:
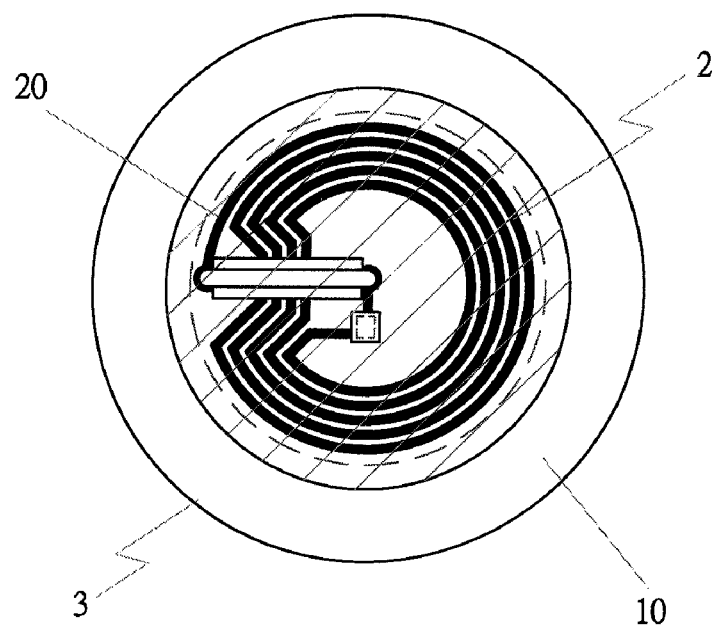
FIG. 10 is an upper view of a substratum label used in a fourth preferred embodiment of a manufacturing method in the present invention.
Figure 11:
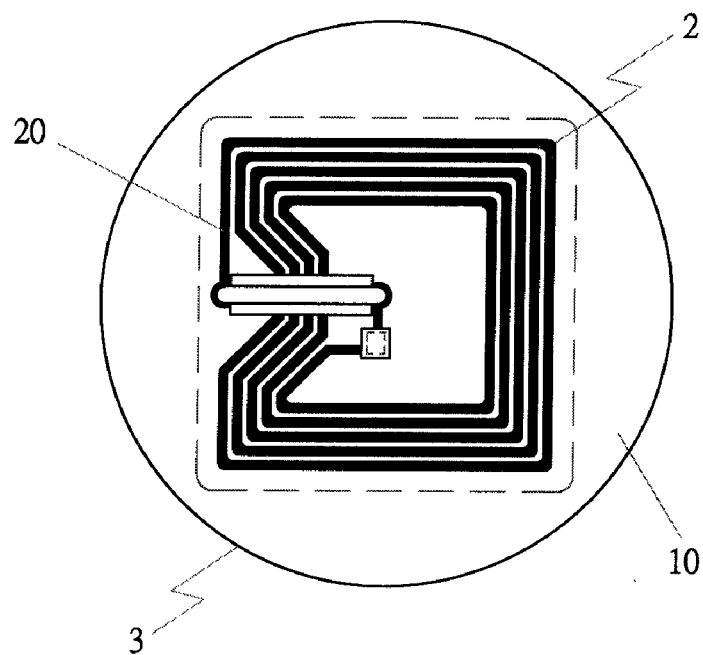
FIG. 11 is an upper view of a substratum label used in a fifth preferred embodiment of a manufacturing method in the present invention.

The second step is to attach a RFID label 2 on a product being made in a mold, and the RFID label 2 is an electronic circuit board 20 with a radio frequency identification chip and an antenna arranged thereon, which preferably has a thickness 0.05-0.3 mm and any shape such as square shown in FIGS. 6 and 10 or round shown in FIG. 10. and antenna, and an adhesive layer 21 is then adhered on the radio frequency identification chip and the antenna, but this adhesive layer 21 can be omitted as shown in FIGS. 9 and 11. Then the RFID label 2 can be attached on one side of the substratum 10, making a substratum label 3 composed of the substratum 10 and the RFID label 2 as shown in FIGS. 7 and 8. Next, a printed layer can be added to the RFID label 2, and a connecting layer 22 can be added to the underside of the RFID label 2 as shown in FIG. 8 for attaching the substratum label 3 to a plastic product being formed in the mold, preferably made of the same material as that of the plastic product so that the substratum label 3 may be sufficiently attached to a product during the product being formed in the mold. However, if the RFID label 2 is not provided with the adhesive layer 21 as shown in FIGS. 9, 10 and 11, a gelatin film 23 may be adhered to the substratum 10 for making the substratum label 3 containing the substratum and the RFID label 2 as shown in FIG. 9. In addition, high frequency process or supersonic process can be used for combining the RFID label 2 with the substratum 10 to make the substratum label 3 as well as shown in FIG. 11.

Next, the third step of the manufacturing method is to prepare a second mold 4, which the substratum label 3 is to be placed therein and also used for injecting molding a plastic product 4 therein so that the substratum label 3 may automatically be attached in the plastic product when finished. Thus, the RFID label 2 is completely wrapped between the substratum and the plastic product 5 so the RFID can be protected from broken or damaged, enhancing the value of the plastic product.

Figure 2:
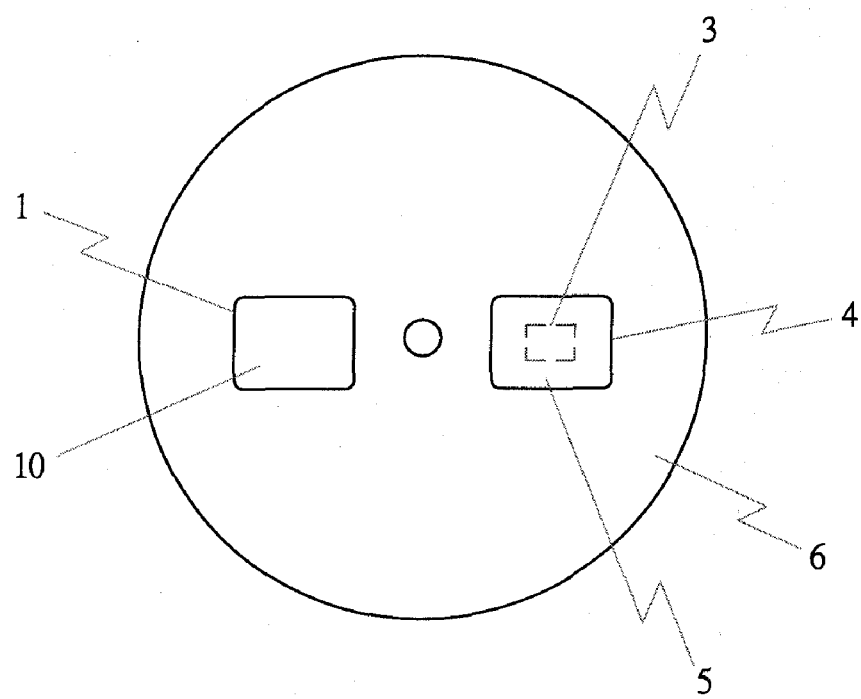
FIG. 2 is an upper view of a forming device used in a first preferred embodiment of a manufacturing method of products attached with an RFID label in a mold in the present invention.
Figure 3:
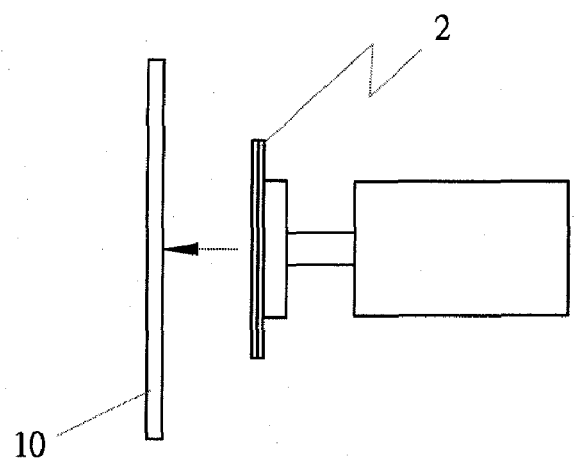
FIG. 3 is a side view of an substratum and a RFID label used in a second step of the manufacturing method of products attached with an RFID label in a mold in the present invention.

FIGS. 2 and 3 show an upper view of a first mold 1 and a second mold 4 positioned on a interchanging base 6 used in a first preferred embodiment of a manufacturing method of products attached with an RFID label in a mold, A substratum 10 is formed in the first mold 1, which is then moved circularly by the rotation of the interchanging base 6 to the location where the second mold 4 is and then the second mold 4 may be moved to the original location of the first mold 1, with the first mold 1 being all the same as the second mold 4. Then the first mold 1 with the substratum 10 moved at the right side is to be opened manually or mechanically for placing an RFID label 2 closely beside the substratum 10 in the first mold 1, and then closed tightly. Then the first mold 1 is combined with an injecting arm of an injecting molding machine so that plastic may be injected in the first mold 1 to form a plastic product that the substratum label 3 with the RFID label 2 may automatically be attached between the substratum and the plastic product. Thus the finished plastic product 5 is attached with the RFID label 2, which is protected by the rather thick substratum 10 from easily broken, damaged or worn off. Thus the RFID can always maintain identified capacity, with the plastic products raised in the value.

Figures 4, 5:
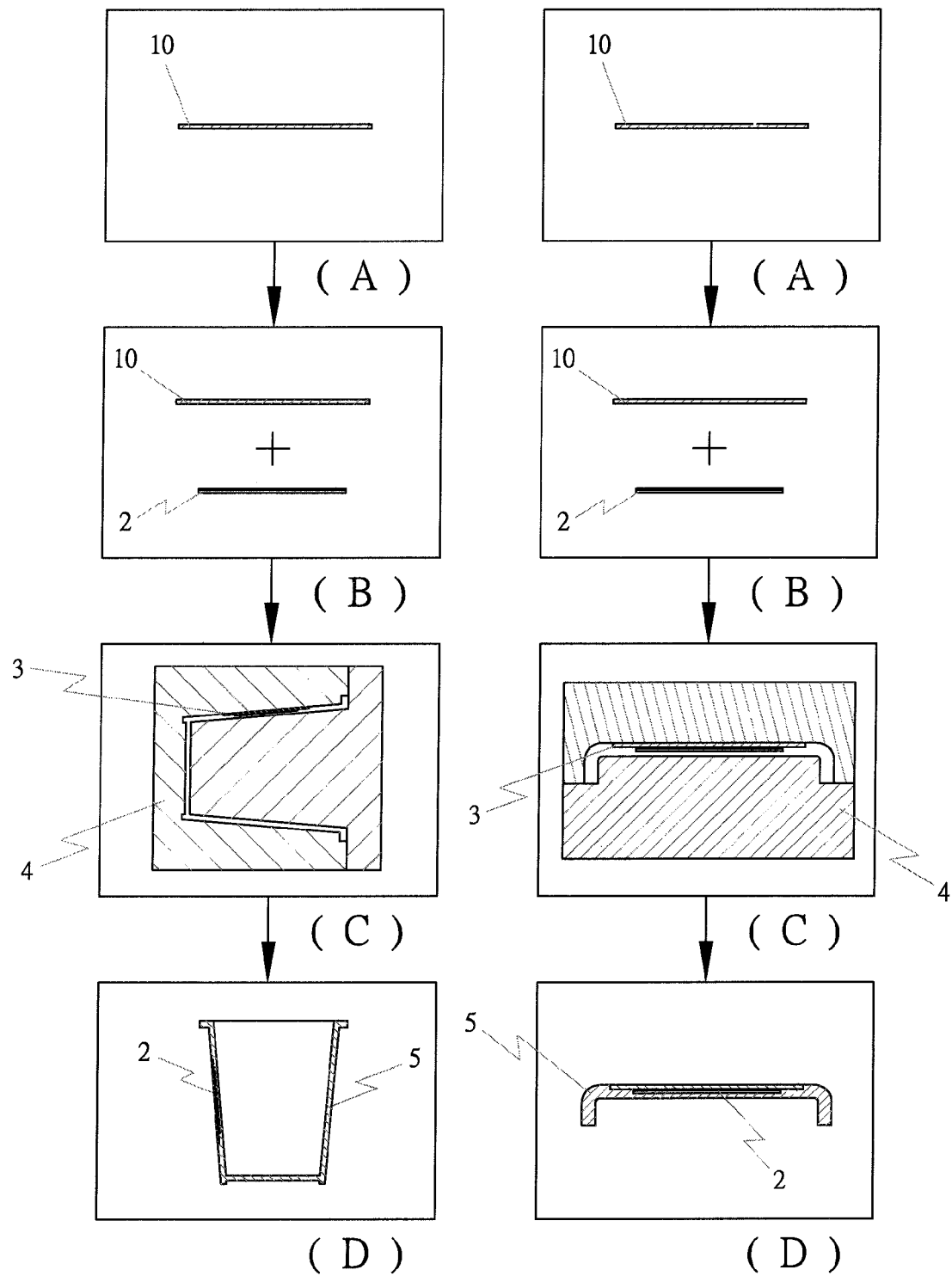
FIGS. 4a, 4b, 4c and 4d are respectively an upper, a side, and two side cross-sectional views of a cup (as a plastic product) being formed to be attached with an RFID label in a second preferred embodiment of a manufacturing method in the present invention.
FIGS. 5a, 5b, 5c and 5d are respectively an upper, a side and two side cross-sectional views of a cap (as a plastic product) attached with an RFID in the second preferred embodiment of a manufacturing method in the present invention.

Next, FIGS. 4 and 5 show a second preferred embodiment of a manufacturing method of products attached with an RFID label in a mold, after the substratum 10 is formed in the first mold, the RFID label 2 is manually or mechanically adhered with the substratum 10 to form a substratum label 3, then the substratum label 3 is placed in the second mold 4 and plastic is injected in the second mold 4, letting the substratum label 3 closely attached with the plastic product during molding process, Thus, as the substratum 10 has enough thickness and toughness so as to protect the RFID label 2 from easily broken, damaged or worn off.

Figure 12:
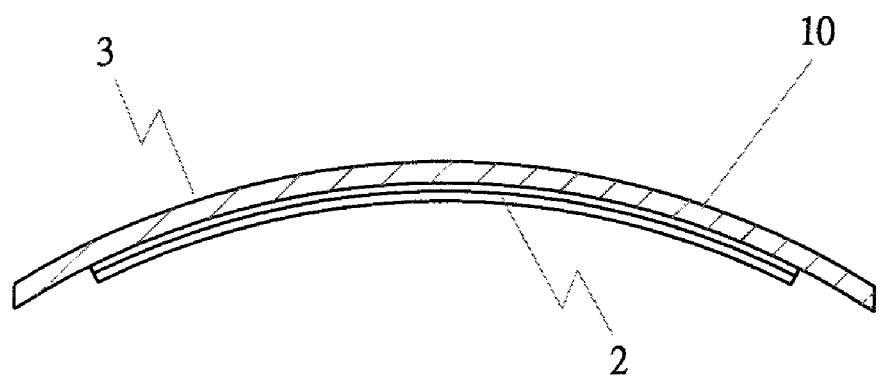
FIGS. 12A and 12B are cross-sectional views of a substratum label used in a sixth preferred embodiment of a manufacturing method in the present invention; and, FIGS. 13A, 13B, 13C and 13D are the perspective views of various products made by the manufacturing method in the present invention.
Figure 12:
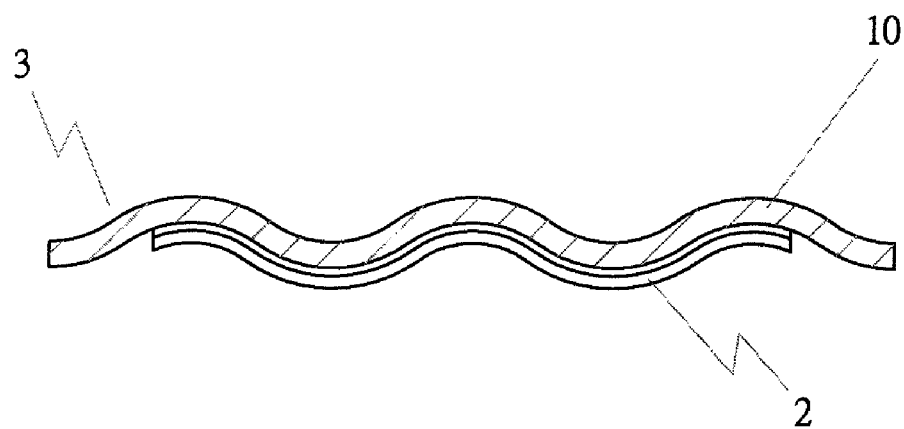
Figure 13:
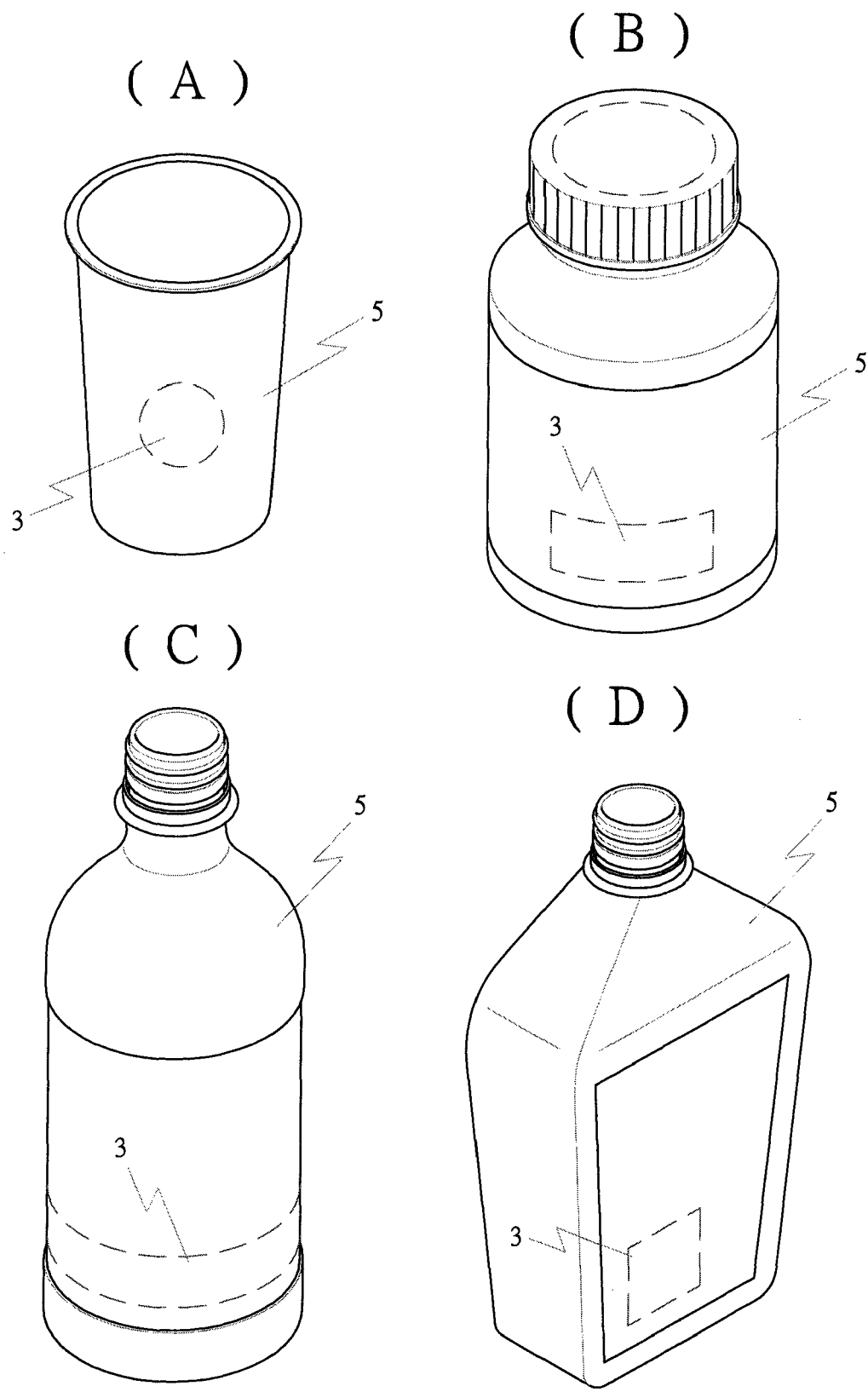

As to the shape of the plastic product 5, it can be of any shape, such as a bottle, a cup, a cap, shown in FIG. 12 having curved or bent with irregular lines, with a common advantage that the RFID label 2 may be sufficiently wrapped by the substratum 10 and the plastic product 5. As the substratum 10 and the plastic product 5 are not liable to break, substantially protecting the RFID label 2 from broken, damaged or worn off, with the plastic product always completely identifiable by means of the RFID label.

While the preferred embodiments of the invention have been described above, it will be recognized that various modifications may be made therein and the appended claims are intended to cover all such modifications that may fall into the spirit and scope of the invention.

What is claimed is:

1. A manufacturing method of a product attached with an RFID label in a mold, said method comprising:

providing a first mold and a second mold positioned on a rotatable base;

molding a substratum in the first mold while the first mold is located at a predetermined first location and the second mold is located at a predetermined second location;

bringing the first mold to the predetermined second location by rotating the rotatable base, which in turn brings the second mold to the predetermined first location;

attaching a RFID (radio frequency identification device) label which includes an RFID chip and an antenna on a circuit board on the substratum to form a substratum label;

injecting a plastic material into the first mold with the substratum label to form the product attached with the substratum label;

molding a substratum in the second mold while the second mold is located at the predetermined first location and the first mold is located at the predetermined second location;

bringing the second mold back to the predetermined second location by rotating the rotatable base, which in turn brings the first mold back to the predetermined first location;

attaching a RFID (radio frequency identification device) label which includes an RFID chip and an antenna on a circuit board on the substratum to form a substratum label;

injecting a plastic material into the second mold with the substratum label to form the product attached with the substratum label;

removing the product attached with the substratum label; and repeating the above steps.

2. The manufacturing method as claimed in claim 1, wherein the RFID label is attached on the substratum while the first mold or the second mold is located at the predetermined second location.

3. The manufacturing method as claimed in claim 1, wherein the first mold and the second mold have the same size and shape.

4. The manufacturing method as claimed in claim 1, wherein the injected plastic material is exposed to inner sidewalls of the second mold, and the product is formed mainly by the injected plastic material.

* * * * *